Feb. 14, 1967 E. P. G. WRIGHT 3,304,373

LONG DISTANCE TASI COMMUNICATION SYSTEMS HAVING ANSWER-BACK SIGNALLING

Filed March 13, 1963 2 Sheets-Sheet 2

United States Patent Office 3,304,373

Patented Feb. 14, 1967

3,304,373

LONG DISTANCE TASI COMMUNICATION SYSTEMS HAVING ANSWER-BACK SIGNALLING

Esmond Philip Goodwin Wright, London, England, assignor to International Standard Electric Corporation, New York, N.Y., a corporation of Delaware

Filed Mar. 13, 1963, Ser. No. 264,906
Claims priority, application Great Britain, Mar. 30, 1962, 12,285/62
8 Claims. (Cl. 179—15)

The present invention relates to long-distance telecommunication switching system, and especially to international or intercontinental telephone switching systems.

In such systems a considerable amount of signalling both from the calling end and from the called end is needed. Some of this signalling includes signals to which an acknowledgment must be transmitted to the originating point for those signals.

The object of the present invention is to shorten the time needed for signalling in systems in which some at least of the signals call for acknowledgement.

According to the present invention, in a long-distance telecommunication switching system, when a first signal whose reception calls for acknowledgement reaches a transit centre, an acknowledgement signal is sent backward from the transit centre towards the point of origin of said first signal, and the first signal is transmitted forward from the transit centre, said forward transmission from the transit centre being maintained until such time as an acknolwedgement signal reaches the transit centre.

An embodiment of the present invention will now be described with reference to the accompanying drawing, and it will be described in its application to the Answer Signal from a called subscriber's line, the system being assumed to be one using TASI (i.e. Time-Assignment Speech Interpolation), although the invention is not so limited in its application, and will be described with reference to the accompanying drawings, in which.

Figure 1:
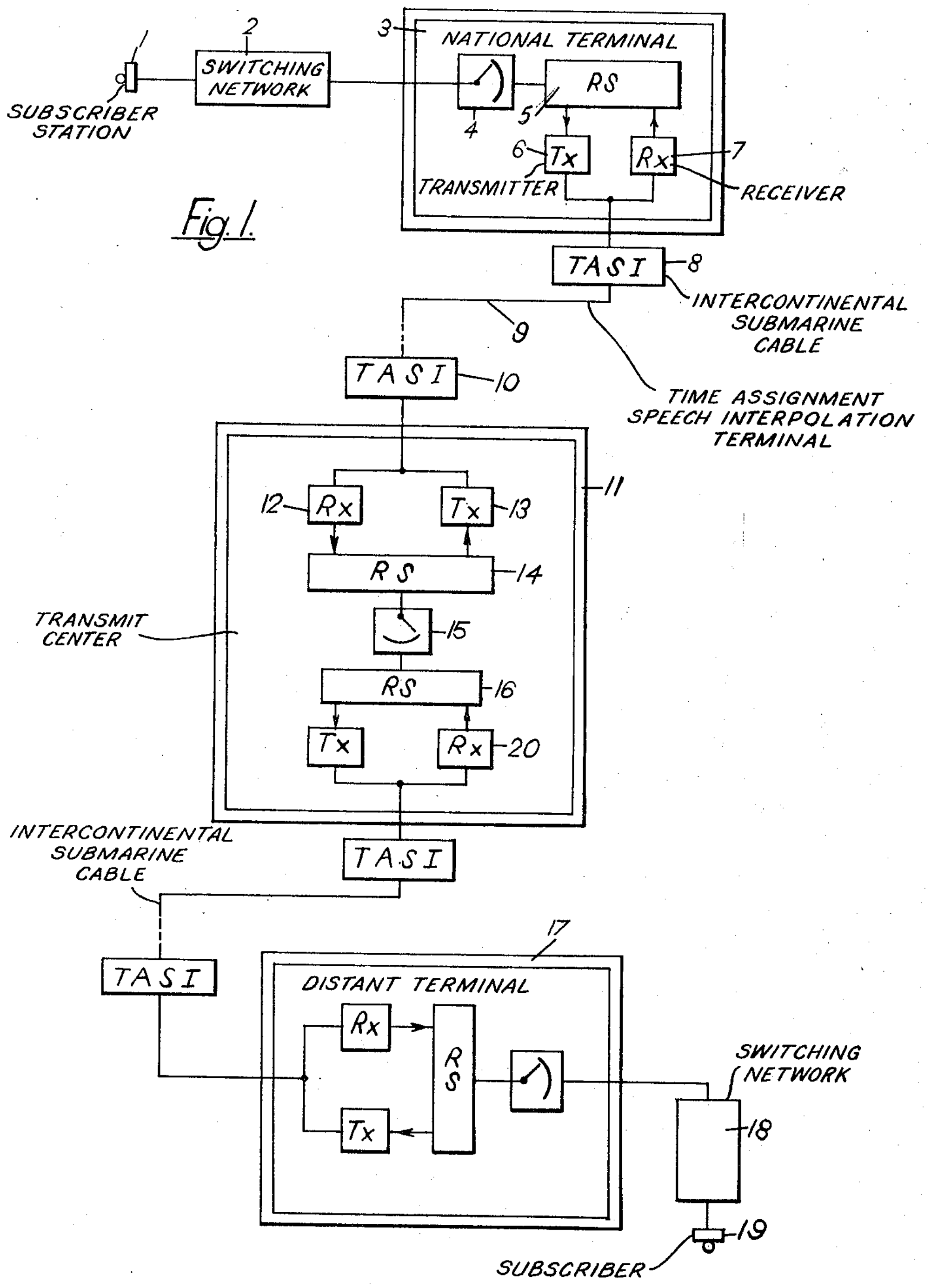
FIG. 1 is a block schematic of an intercontinental system using the invention.

The accompanying diagram is limited to a simple block schematic because the various items which it includes are either strictly conventional or can be readily produced in accordance with well known principles.

A connection from a calling subscriber 1 is set up via the local network 2 to which his line is connected, in the presest case his national and continental network, to an outgoing intercontinental terminal centre 3. This includes switching equipment 4, which seizes a relay set 5 for use for the connection. The latter, which is one of a number of relay sets available for a connection in the required direction, is connected via a signal transmitter 6 and a signal receiver 7 to one of a number of inlets to a TASI (i.e. Time-Assignment Speech Interpolation) terminal 8.

The terminal 8 is connected via a link 9, which may be a submarine cable link, such as the Trans-Atlantic submarine coaxial cable link, or a radio link, to a further TASI terminal 10. The latter "unscrambles" the various communication connections existing via the TASI link, which feeds a transit centre 11. For the connections being described there is seized a receiver 12, transmitter 13 (for backward signals) and a relay set 14. The latter has access via switching equipment 15 to a relay set such as 16 in the required direction. From here the connection is extended via a further TASI link to the long distance terminal centre 17 appropriate to the wanted subscriber. Finally the connection is set up via the local switching network 18—either national or continental—to the wanted subscriber's line 19.

It should be noted that the connection may extend via two or more transit centres such as 11, and that where the links such as 9 are radio links, one or more of the transit centres could be orbiting satellites whose distance from the surface of the earth is such that they remain stationary as seen from the earth.

The invention is described in its application to the Answer Signal because the period between a called subscriber answering a call and the caller knowing that he has answered should be kept as short as possible. This shortening of time avoids unnecessary channel occupation which, on long-distance systems involves unnecessary expense. In addition it reduces the risk that the caller will lose patience and hang up under the impression that his call has failed.

The Answer Signal, which informs the caller that he has reached the wanted party and that the latter has replied, is sent from the wanted party's end of the established connection over the return channel. Now where the interconnecting links are TASI links, as is the case in the system briefly described above, this involves at each stage the attachment of a free TASI channel for that signal. Such signalling could be dealt with by using end-to-end signalling, the answer signal being sent direct from end-to-end without being detected and handled at transit centres, or by link-by-link signalling, where the signal is recognized at each transit centre, its receipt acknowledged by an acknowledgement signal transmitted backward over the backward channel, and then extended forward towards the "calling" end in the case of an Answer Signal. In the present system a special variant of link-by-link signalling for dealing with the Answer Signal is used.

In a TASI system it is assumed that a signal delay of 500 milliseconds can be tolerated, and the possibility of exceeding this depends on whether "freeze-out" occurs on any of the TASI links. Freeze-out occurs when a connection in the active condition (i.e. with intelligence to send) cannot get a free channel because of overload. Another consideration to be borne in mind is that the signalling method should be sufficiently rapid to ensure that the Answer Signal and its acknowledgement signals cannot obstruct the calling subscriber when he starts to speak on receiving the Answer Signal. Such obstruction could also lead to false charging, which is somewhat unpopular with subscribers.

In a busy TASI system it has been estimated that approximately 5% of speech bursts will experience freeze-out, but it is not safe to make a similar assumption in respect of Answer Signals because these may often follow a silent period of several seconds. However, even if one assumes that 15% of the Answer Signals experience freeze-out, there is no reason to believe that the extent of the delay thus caused to the Answer Signals will differ from that applying to speech.

A possible distribution of freeze-out delay for Answer Signals could be as follows:

| | Percent |
|---|---|
| No delay | 85 |
| Delay less than 62 milliseconds | 95 |
| Delay less than 125 milliseconds | 98 |
| Delay less than 250 milliseconds | 99 |

In some cases two or more channels will be in series, but there is no superficial reason why a maximum of speech bursts, i.e. an overload condition, should be coincident on channels connected in series. As a consequence there is a very small likelihood of long delays being associated with the same speech burst (or Answer Signal). The average delay will be only 5–10 milliseconds.

In the long-distance systems being considered, about one Answer Signal in a hundred needs to pass over three links in series, and probably not more than one channel attachment delay (i.e. delay due to a channel of the TASI link not being immediately available) in a hundred is likely to exceed 250 milliseconds. This is the statistical condition summarised in the preceding paragraph. Consequently the chance of experiencing two or more long delays on any connection can be neglected in practice.

Considering firstly the period needed to pass the Answer Signal over three channels in series, the quickest process will be that in which the transit centres are designed to treat the signal as a speech burst and then to obtain channel association before making any attempt to distinguish between signal imitation and a correct signal. To attempt to ensure recognition, or to await the completion of the signal, would result in more delay. Hence in the system described briefly above, the transit centre seizes for use a TASI channel in the forward direction before it has attempted to distinguish between a real and a spurious answer signal. If the Answer Signal is real the seized TASI channel is retained as long as forward transmission of the Answer Signal is maintained; if it is spurious the channel is dropped.

As the called party cannot know whether an incoming call is intercontinental or local, the answering procedure will not vary with distance. Although it is likely that the Answer Signal will take longest to be transferred in the case when there are three intercontinental links, it is to be expected that the number of connections with a single intercontinental link will be very much greater, and in consequence even the risk of a small percentage of speech interruption would be objectionable.

The rapid handling of the Answer Signal is attained, in the present system, by a variant of the link-by-link technique mentioned briefly above, in which the Answer Signal, is immediately extended, as if it were a speech burst, and in which the line receivers at transit head-of-the-line centres are caused to operate in recognition of a signal in two different ways, firstly to return an acknowledgement signal towards the wanted party, and secondly to maintain the extension signal, i.e. the forward transmission of the Answer Signal, until it is acknowledged. Where a spurious signal simulating an Answer Signal is not long enough to cause recognition at the transit centre, in addition to the fact that a forward TASI channel is temporarily seized and then dropped, it does not compel the production of any backward signal from the transit centre towards the wanted party. Further, such signal imitation does not cause the extension of any signal beyond the transit centre to be maintained. The connection at the transit centre is not split by the reception of a signal, but after recognition of the signal the return channel can be split in preparation for the acknowledgement signal from the next centre.

An even quicker process for establishing the speech channel can be achieved by commencing the transmission of the acknowledgement signal before the Answer Signal has been recognised. This form of signalling is faster than compelled end-to-end signalling or any type of pulse signalling. In a compelled end-to-end system although a signal (e.g. an Answer Signal) is sent from end-to-end, each time it passes via a transit centre and when it reaches the end of the connection an acknowledgement signal is sent.

Thus the use of the novel signalling technique referred to above enables the overall time needed to deal with the Answer Signal to be reduced as compared with known techniques, an improvement whose value will be readily apparent. The technique is useful for TASI and non-TASI systems and also in circumstances in which a single connection may have to use both TASI and non-TASI links. Thus the connection may include national toll and continental channels on either or both sides of the intercontinental channel. As a consequence, there may be some time expended in reaching the outgoing intercontinental terminal, and a similar time may be needed after the signal has left the last intercontinental channel. Furthermore, an interconinental channel will not normally be available for speech immediately after the recognition of the Answer Signal.

Because of the importance of the time factors already discussed, it will be seen that in where two or three intercontinental links have to be negotiated by a signal it becomes impracticable to consider an end-to-end signalling system unless the acknowledgements are sent on a link-by link basis. With a pulse link-by-link system there would be no serious likelihood of speech finding the first link free and the remaining links still in use because the signals would only be separated by a propagation time plus a recognition time; as the speech is passing in the same direction as the signal it would experience the same propagation delay.

The special technique referred to above, which can be regarded as either a special form of link-by-link system or a special form of compelled signalling system reduces considerably the time between a wanted party replying and the caller knowing that he has replied. As already mentioned, this technique is specially useful for dealing with Answer Signals but can be used for other signals, and is useable whether or not TASI is in use.

To return for a moment to the splitting which occurs at a transit centre when an Answer Signal is dealt with, the extension forward of that signal does not involve any splitting of the channel. However, the return of the acknowledgment signal does involve splitting. The significance of this difference in operation for the two directions is that no confusion can occur which could cause an acknowledgment signal from one transit centre to be confused with an answering signal elsewhere.

Figure 2:
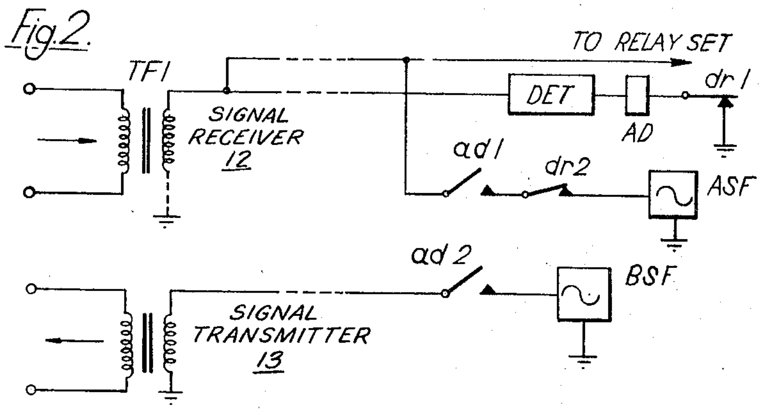
FIG. 2 is a greatly simplified circuit of the answer signal acknowledgement arrangements.

In the circuit of FIG. 2, which shows such of the circuits relating to the answer signal and the acknowledgment signal, and includes elements which form part of a signal receiver such as 12 and a transmitter such as 13 (FIG. 1). Incoming signals arrive via the transformer TF1 from which they are applied to a detector DET, which energizes its output to operate relay AD when an answer signal arrives. Where the answer signal is a distinctive frequency or frequency combination, DET could include tuned filters and amplifiers.

When AD operates, the closure of its contact *ad*1 connects a source ASF of answer signal conditions to the forward transmission path from the receiver 12 to the associated relay set 14. Thus the answer signal is extended forward. The relay AD also closes its contacts *ad*2 to connect a signal source BSF to the backward signalling path from the signal transmitter 13. This source supplies the acknowledgment signal. This can either persist as long as relay AD remains operated, or can have a defined duration.

When in due course the backward path receiver 20 in the same transit centre receives an acknowledgment signal a circuit therein similar to that controlling AD responds and sends a signal condition to the relay set 14, where it operates a relay DR (not shown) which at its contacts *dr*1 and *dr*2 causes the termination of signalling since both sources ASF and BSF are thereby disconnected.

To consider briefly conditions before the Answer Signal is sent, it is desirable for accurate establishment of connections and for the avoidance of unnecessary charging, that dialled digits be accurately received. This can use a form of compelled acknowledgment for the numerical signals, but a preferred method exists whereby some degree of redundancy is added to the numerical signals. Note that the term "numerical" here embraces codes which are usually assigned letters for convenience of memorising. Thus, for example, rather than use a compelled method of acknowledging the numerical signals it would be better to add a two-frequency pulse representing a value complementary to the sum of the digits dialled on a modulo 10 basis, e.g. the digits 196 would have a modulo 10 sum of 6, giving a check value of 10−6=4. This would add only 100 milliseconds per call and would not normally lengthen the connecting time.

The effect of this (in the above example) is that 196 would be sent as 1964.

With such a system the reception of a dialled number (which might have 10 or more digits in a world wide system) would result in a modulo 10 test being performed on that number. If the division by 10 left a remainder a query signal would then be sent to the originating point.

Figure 3:
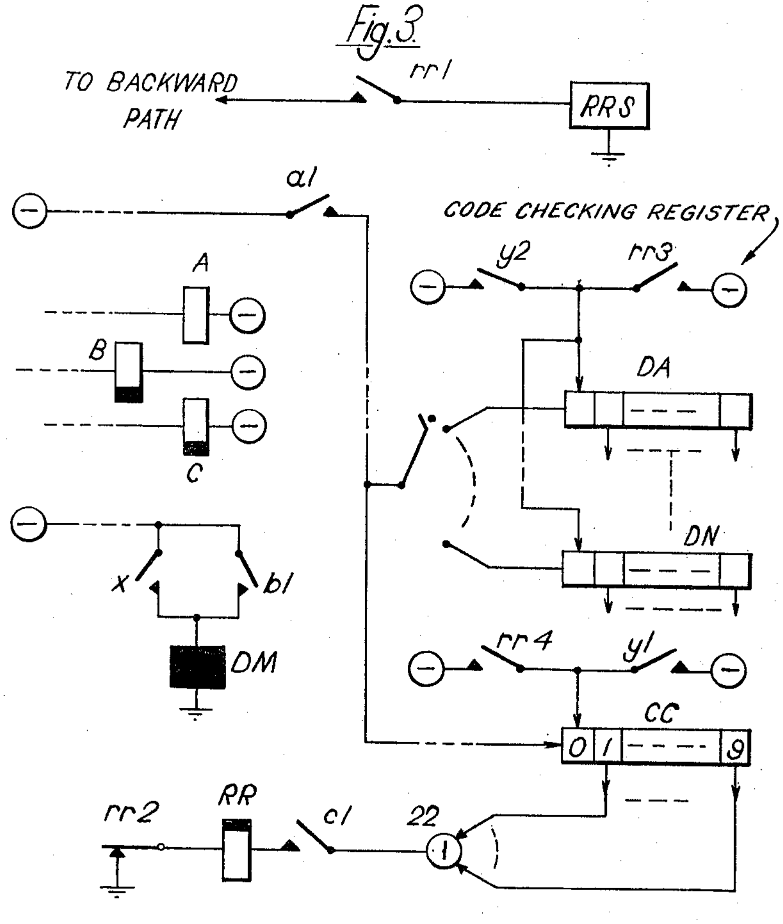
FIG. 3 shows schematically how the accuracy of received dialed digits is checked.

FIG. 3 shows in simplified form the elements of a register circuit which are used for receiving and checking a dialled digit. The relays A, B and C, of which the operating circuits are not shown form a conventional A–B–C– relay combination, relay A responding to each received digit pulse and controlling relay B, relay B detecting the interdigital pauses, and relay C detecting the end of a dialled number.

When the apparatus shown is seized for use, a contact *x* is closed by means not shown to cause drive magnet DM for a uniselector acting as a distributor. This steps to its first position in which the connection is connected to the first counter DA. As relay A follows the impulses, each impulse steps DA once from its rest position. When B operates in the inter-digital pause it steps DM so that the next digit goes into the second counter. This continues until all digits are in, the *n*th and last digit entering counter DN. After this last digit, relay C operates and closes *c*1, in addition to other functions of known variety.

Each received pulse is applied to a further counter CC, which is a 10-stage closed-ring counter which normally has stage 0 energized. As the dialled number, plus its suffix is an exact multiple of 10, the final state of CC should, if the reception is correct, be 0. If not, then the OR gate 22 receives an output from one of the stages 1–9 of counter CC, and this operates relay RR, which at *rr*1 connects a source RRS of a repeat request signal to the backward path. To limit the duration of this signal, relay RR opens its own circuit at *rr*2, but as it is slow to release a pulse of signal is sent from RRS. In addition, RR resets the counters DA–DN at *rr*3 and resets CC at *rr*4. Thus the arrangement is ready to deal with a repeated version of the queried digits.

When the register is released, contact $y^1$ resets CC to 0 and $y^2$ resets all of DA–DN to rest. These counters are not ring counters, and each has a rest position and 10 operated conditions.

The contents of DA–DN, when rated as valid, eventually control call setting.

It is to be understood that the foregoing description of specific examples of this invention is not to be considered as a limitation on its scope.

What I claim is:

1. A long distance TASI telecommunication transmission system comprising means for establishing a connection from a first station through said system via at least one transmit center to a second station, means at said first station for transmitting a demand signal through said transmit center to request said connection, means in said transmit center operated responsive to said demand signal for transmitting an acknowledgment answer signal from said transmit center back to said first station while simultaneously transmitting a forward demand signal from said second station, and means in said transmit center for maintaining the transmission of said forward demand signal until said transmit center receives an acknowledgment signal from said second station.

2. The system of claim 1 and means for simultaneously starting the transmission of said acknowledgment signal and said forward demand signal.

3. The system of claim 2 wherein each of said stations comprise a switching network having subscriber stations connected thereto and a long distance terminal connected to said switching network, means responsive to an answer by a called subscriber for sending an acknowledgment signal from said transmit center to the called subscriber station and an answer signal to the calling subscriber station, and means responsive to an acknowledgment of said answer signal for terminating transmission of said signals.

4. The system of claim 1 and means responsive to an apparent acknowledgment signal for immediately seizing a free TASI channel, and means for thereafter releasing said TASI channel if said acknowledgment signal is a spurious signal.

5. The system of claim 1 and means for transmitting signals in a code each digit of which can assume any one of *n* possible significances, in which a message which contains *m* data-bearing digits has appended to it an extra digit whose value is so chosen that no remainder is obtained when the $(m+1)$ digit number is divide by *n*.

6. The system of claim 1 and means for checking received messages, in which the messages are received in a code each digit of which can assume any one of *n* possible significances, in which each message as received includes *m* data bearing digits and an extra digit whose value is such that the remainder obtained when the $(m+1)$ digit number is divided by *n* is 0, in which each digit on reception is applied to a counter having *n* positions, and in which a message is only assumed to be correctly received if, after all $(m+1)$ digits have been received said counter has returned to its original condition.

7. The system of claim 6 in which *n* is 10, i.e. the messages are decimal numbers.

8. The system of claim 6 in which said messages are conveyed by pulses of alternating current of one or more frequencies.

References Cited by the Examiner

UNITED STATES PATENTS

| | | | |
|---|---|---|---|
| 2,498,700 | 2/1950 | Munck | 178—4 |
| 2,848,545 | 8/1958 | Mitchell | 179—15 |
| 2,886,240 | 5/1959 | Linsman | 235—153 |
| 3,035,769 | 5/1962 | Reumerman et al. | 235—153 |

DAVID G. REDINBAUGH, *Primary Examiner.*

ROBERT L. GRIFFIN, *Assistant Examiner.*